US008243157B2

(12) United States Patent
Ng et al.

(10) Patent No.: US 8,243,157 B2
(45) Date of Patent: Aug. 14, 2012

(54) CORRECTION OF OPTICAL ABERRATIONS

(75) Inventors: Yi-Ren Ng, San Mateo, CA (US); Patrick M. Hanrahan, Portola Valley, CA (US); Mark A. Horowitz, Menlo Park, CA (US); Marc S. Levoy, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 604 days.

(21) Appl. No.: 12/278,708

(22) PCT Filed: Feb. 6, 2007

(86) PCT No.: PCT/US2007/003420
§ 371 (c)(1),
(2), (4) Date: Jan. 26, 2009

(87) PCT Pub. No.: WO2007/092581
PCT Pub. Date: Aug. 16, 2007

(65) Prior Publication Data
US 2009/0128669 A1    May 21, 2009

Related U.S. Application Data

(60) Provisional application No. 60/765,903, filed on Feb. 7, 2006, provisional application No. 60/810,432, filed on Jun. 2, 2006.

(51) Int. Cl.
*H04N 5/228* (2006.01)
*G03B 13/00* (2006.01)
*H04N 5/232* (2006.01)

(52) U.S. Cl. ...................... 348/222.1; 348/349; 348/350

(58) Field of Classification Search ............... 348/222.1, 348/349, 350
See application file for complete search history.

(56) References Cited

U.S. PATENT DOCUMENTS

| 3,971,065 A | 7/1976 | Bayer |
| 4,383,170 A | 5/1983 | Takagi et al. |

(Continued)

FOREIGN PATENT DOCUMENTS

WO    WO 00/22566    4/2006

(Continued)

OTHER PUBLICATIONS

Adelson, T., and Wang, I. Y. A. 1992. Single lens stereo with a plenoptic camera. *IEEE Transactions on Pattern Analysis and Machine Intelligence* 14, 2 (Feb. 1992), 99-106.

(Continued)

*Primary Examiner* — Sinh Tran
*Assistant Examiner* — Christopher K Peterson
(74) *Attorney, Agent, or Firm* — Courtney IP Law; Barbara B. Courtney

(57) ABSTRACT

Digital images are computed using an approach for correcting lens aberration. According to an example embodiment of the present invention, a digital imaging arrangement implements microlenses to direct light to photosensors that detect the light and generate data corresponding to the detected light. The generated data is used to compute an output image, where each output image pixel value corresponds to a selective weighting and summation of a subset of the detected photosensor values. The weighting is a function of characteristics of the imaging arrangement. In some applications, the weighting reduces the contribution of data from photosensors that contribute higher amounts of optical aberration to the corresponding output image pixel.

15 Claims, 6 Drawing Sheets

U.S. PATENT DOCUMENTS

| | | | |
|---|---|---|---|
| 4,448,497 | A | 5/1984 | Wakamiya |
| 4,661,986 | A | 4/1987 | Adelson |
| 4,694,185 | A | 9/1987 | Weiss |
| 5,076,687 | A | 12/1991 | Adelson |
| 5,282,045 | A | 1/1994 | Mimura et al. |
| 5,629,734 | A | 5/1997 | Hamilton, Jr. et al. |
| 5,748,371 | A | 5/1998 | Cathey, Jr. et al. |
| 5,757,423 | A | 5/1998 | Tanaka et al. |
| 6,023,523 | A | 2/2000 | Cohen et al. |
| 6,028,606 | A | 2/2000 | Kolb et al. |
| 6,028,608 | A * | 2/2000 | Jenkins ............... 345/619 |
| 6,097,394 | A * | 8/2000 | Levoy et al. ............ 345/419 |
| 6,320,979 | B1 | 11/2001 | Melen |
| 6,483,535 | B1 | 11/2002 | Tamburrino et al. |
| 6,577,342 | B1 | 6/2003 | Wester |
| 6,842,297 | B2 | 1/2005 | Dowski, Jr. et al. |
| 7,119,319 | B2 | 10/2006 | Noto et al. |
| 7,164,446 | B2 | 1/2007 | Konishi |
| 7,167,203 | B1 | 1/2007 | Yukawa et al. |
| 7,367,537 | B2 | 5/2008 | Ibe |
| 2002/0159030 | A1 | 10/2002 | Frey et al. |
| 2003/0117511 | A1 | 6/2003 | Belz et al. |
| 2003/0156077 | A1 | 8/2003 | Balogh |
| 2005/0080602 | A1 | 4/2005 | Snyder et al. |
| 2006/0033005 | A1 * | 2/2006 | Jerdev et al. ............ 250/208.1 |
| 2006/0101080 | A1 * | 5/2006 | Atsumi et al. ........... 707/200 |
| 2007/0030379 | A1 * | 2/2007 | Agranov .................. 348/340 |
| 2008/0043117 | A1 * | 2/2008 | Kim et al. ............... 348/224.1 |
| 2008/0303920 | A1 * | 12/2008 | Kinoshita ............... 348/226.1 |

FOREIGN PATENT DOCUMENTS

| | | |
|---|---|---|
| WO | WO 2006/039486 | 4/2006 |
| WO | PCT/07/03420 | 2/2007 |

OTHER PUBLICATIONS

Agarwala, A., Dontcheva, M., Agrawala, M., Druckers, S., Colburn, A., Curless, B., Salesin, D., and Cohen, M. 2004. Interactive digital photomontage. *ACM Transactions on Graphics (Proceedings of SIG-GRAPH 2004)* 23, 3, 292-300.

Askey, P., 2005. Digital cameras timeline: 2005. Digital-Photography Review, http://www.dpreview.com/reviews/timeline.asp?s~=2005.

Debevec, P. E., and Malik, J. 1997. Recovering high dynamic range radiance maps from photographs. In *SIGGRAPH 97*, 369-378.

Dowski, E. R., and Johnson, G. E. 1999. Wavefront coding: A modem method of achieving high performance and/or low cost imaging systems. In *SPIE Proceedings*, vol. 3779.

Durand, F., Holzschuch, N., Soler, C., Chan, E., and Sillion, F. 2005. A frequency analysis of light transport. *ACM Transactions on Graphics (Proceedings of SIGGRAPH 2005)* 24, 3, 1115-1126.

Haro, L. D. S. 2000. *Wavefront Sensing in the Human Eye with a Shack-Harfmann Sensor*. PhD thesis, University of London.

Mitchell, D. P., and Netravali, A. N. 1998. Reconstruction filters in computer graphics. In SIGGRAPH 98, 221-228.

Nayar, S., and Mitsunaga, T. 2000. High Dynamic Range Imaging: Spatially Varying Pixel Exposures. In *IEEE Conference on Computer Vision and Pattern Recognition (CVPR)*, vol. 1, 472-479.

Ng, R., Levoy, M., Bredif, M., Duval, G., Horowitz, M., and Hanrahan, P. 2005 Light field photography with a hand-held plenoptic camera. Tech. rep., Stanford University Computer Science.

Stewart, J., Yu, J., Gortler, S.J., and McMillan, L. 2003. A new reconstruction filter for undersampled light fields. In *Proceedings of the Eurographics Symposium on Rendering 2003*, 150-156.

Vaish, V., Garg, G., Talvala, E.-V., Antunez, E., Wilburn, B., Horowitz, M., and Levoy, M. 2005. Synthetic aperture focusing using a shear-warp factorization of the viewing transform. In *Workshop on Advanced 30 Imaging for Safety and Security (in conjunction with CVPR 2005)*.

Wilburn, B., Joshi, N., Vaish, V., Talvala, E.-V., Antunez, E., Barth, A., Adams, A., Levoy, M., and Horowitz, M. 2005. High performance imaging using large camera arrays. To appear at SIGGRAPH 2005.

J. Jackson et al. "Selection of a Convolution Function for Fourier Inversion Using Gridding." *IEEE Transactions on Medical Imaging*, Sep. 1991. vol. 10, No. 3, pp. 473-478.

T. Naemura et al. "3-D Computer Graphics based on Integral Photography." *Optics Express*, Feb. 12, 2001. vol. 8, No. 2, pp. 255-262.

F. Okano et al. Three-dimensional video system based on integral photography. *Optical Engineering*, Jun. 1999. vol. 38, No. 6, pp. 1072-1077.

E. Adelson et al. "Single Lens Stereo with a Plenoptic Camera." *IEEE Translation on Pattern Analysis and Machine Intelligence*, Feb. 1992. vol. 14, No. 2, pp. 99-106.

M. Levoy et al. "Light Field Rendering." *SIGGRAPH 96 Proceeding*, 1996. pp. 31-42.

A. Isaksen et al. "Dynamically Reparameterized Light Fields." *SIGGRAPH* 2000, Computer Graphics Proceedings 10 pgs.

A. Agarwala et al. "Interactive Digital Montage." *ACM SIGGRAPH 2004* vol. 23, No. 3, pp. 292-300.

P. Haeberli. "A Multifocus Method for Controlling Depth of Field." *GRAPHICAObscura*, 1994, pp. 1-3.

Ng. R. "Fourier Slice Photography." ACM Transactions on Graphics (Proceedings of SIGGRAPH 2005) 24(3), 735-744.

* cited by examiner

CORRECTION OF OPTICAL ABERRATIONS

RELATED PATENT DOCUMENTS

This patent document claims the benefit, under 35 U.S.C. §119(e), of U.S. Provisional Patent Application No. 60/765, 903, entitled "Imaging Arrangements and Methods Therefor" and filed on Feb.7, 2006; this patent document also claims the benefit, under 35 U.S.C. §119(e), of U.S. Provisional Patent Application No. 60/810,432, entitled "Digital Light Field Photography" and filed on Jun.2, 2006; this patent document is also a continuation-in-part of PCT Patent Application No. PCT/US2005/035189 (publication number W0/2006/039486), entitled "Imaging Arrangements and Methods Therefor" and filed on Sep. 30, 2005, to which priority is claimed under 35 U.S.C. -§ 120 for common subject matter.

FEDERALLY-SPONSORED RESEARCH OR DEVELOPMENT

This invention was made with Government support under contract 0085864 awarded by the National Science Foundation. The Government has certain rights in this invention.

FIELD OF THE INVENTION

The present invention relates generally to imaging applications, and more specifically to processing collected light field data to generate images with correction for optical aberrations.

BACKGROUND

Imaging applications such as those involving cameras, video cameras, microscopes and telescopes have been highly susceptible to image error conditions including those relating to aberrations. Generally, aberrations are imperfections in the optical formula of a lens that prevent perfect convergence. Such aberrations may include, for example, spherical aberration, chromatic aberration, distortion, curvature of the light field, oblique astigmatism and coma. A classical case involves spherical aberration due to rays refracting through a plano-convex lens. This lens has one flat side and one convex spherical side, with rays passing through the periphery of the spherical interface refracting too strongly and converging at a depth closer to the lens, relative to rays that pass close to the center of the lens. Due to this strong refraction, the light from a desired point is blurred over a spot on the image plane, thereby reducing contrast and resolution. Such issues have motivated intense study of image correction and optimization over the years, including contributions from such names as Gauss, Galileo, Kepler, Newton, and innumerable others.

Correction for aberrations has often involved the use of multiple optical elements, which tend to add bulk, expense and weight to imaging devices. In some applications benefiting from small-scale optics, such as camera phones and security cameras, the physical limitations associated with the applications make it undesirable to include additional optics. Moreover, for many digital imaging applications, as the number of photosensors used to collect image data increases and as the arrangement and processing of data from the same becomes increasingly important, aberration and other conditions that raise issue with the creation of images can significantly hinder the ability to create accurate images.

The process of correcting aberrations by combining glass elements has been carried to remarkable extremes. Zoom lenses provide perhaps the most dramatic illustration of this phenomenon. Zooming a lens requires a non-linear shift of at least three groups of lens elements relative to one another, making it very challenging to maintain a reasonable level of aberration correction over the zoom range. To address these challenges, extremely sophisticated and complex design forms have evolved and are now commercially available. As an example, commodity 35 mm zoom lenses generally contain no fewer than 10 different glass elements, and some have as many as 23. Most if not all modern lens design work is computer-aided, where design forms are iteratively optimized by a computer. A large numbers of lens elements provide greater degrees of freedom for such a computer to achieve the desired optical quality. These approaches add bulk, expense and weight to these lenses.

Difficulties associated with the above have presented challenges to imaging applications, including those involving the acquisition and altering of digital images.

SUMMARY

The present invention is directed to overcoming the above-mentioned challenges and others related to imaging devices and their implementations. The present invention is exemplified in a number of implementations and applications, some of which are summarized below.

According to an example embodiment of the present invention, light is detected with both spatial and directional specificity. The detected light, spatial and directional information, and information characterizing aspects of the light detection approach are used to generate a virtual image that corresponds to an image in which aberrations are corrected and, in some instances, an image that is also refocused.

According to another example embodiment of the present invention, light data are processed using light collected with an imaging arrangement including a main lens that focuses light to microlenses at a focal plane, and photosensors that include, for each microlens, a plurality of photosensors arranged to receive light directed by the microlens. The light data is weighted as a function of an optical characteristic of the imaging arrangement and a light ray path of the collected light through the main lens and microlenses, thereby providing weighted light data values. The light data is digitally processed as a function of the weighted light values and the light ray path, and the digitally processed light data is used to output image data in which at least a portion of the image data is corrected.

In one implementation, the light data is digitally processed as follows. Camera rays converging to a virtual output image pixel are sampled, and the world-space conjugates of the rays are computed using an ideal paraxial approximation for the main lens used in collecting light for the image. The direction of the world rays is reversed and the world rays are ray-traced back into the imaging arrangement through a geometrically accurate model of the main lens, through the microlenses and down to the photosensors. The radiance is estimated along each ray from the neighborhood of sensor pixel values in the collected light.

According to another example embodiment of the present invention, a digital imaging system computes an image from a set of detected light rays as follows. The system includes a main lens, a photosensor array for detecting a set of light rays and a microlens array between the main lens and the photosensor array. The set of light rays is optically directed from the main lens and through the microlens array to the photosensor array. Each photosensor detects the light traveling along a set of light rays flowing in the optical system. From the set of photosensor values, an image data processor computes an output image in which at least a portion of the image exhibits corrections for optical aberrations in the main lens and/or the microlenses. Each pixel in the output image is computed by weighting and combining a subset of the photosensor values as a function of optical characteristics of the imaging arrangement.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which:

FIGS. 3A-3D show an arrangement and approach to re-sampling light fields to digitally correct for aberrations in connection with various example embodiments of the present invention, wherein FIG. 3A shows an image collection arrangement, FIG. 3B shows a Cartesian grid for rays integrated by each photosensor in FIG. 3A, FIG. 3C illustrates photosensor values to be weighted and combined to produce a corrected output image pixel value FIG. 3D shows the set of rays passing through a single microlens.

FIGS. 4A-4D show an approach to re-sampling light fields to digitally correct for aberrations in connection with various example embodiments of the present invention, wherein FIG. 4A shows a Cartesian ray-space diagram for aberrated rays in an imaging arrangement FIG. 4B shows a ray diagram for rays flowing from within the imaging arrangement out into the world through real (aberrated) optics FIG. 4C shows a ray diagram for world rays flowing from outside the imaging arrangement into the recording device through ideal (unaberrated) optics FIG. 4D shows a Cartesian ray-space diagram for ideal rays in an imaging arrangement While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1A:
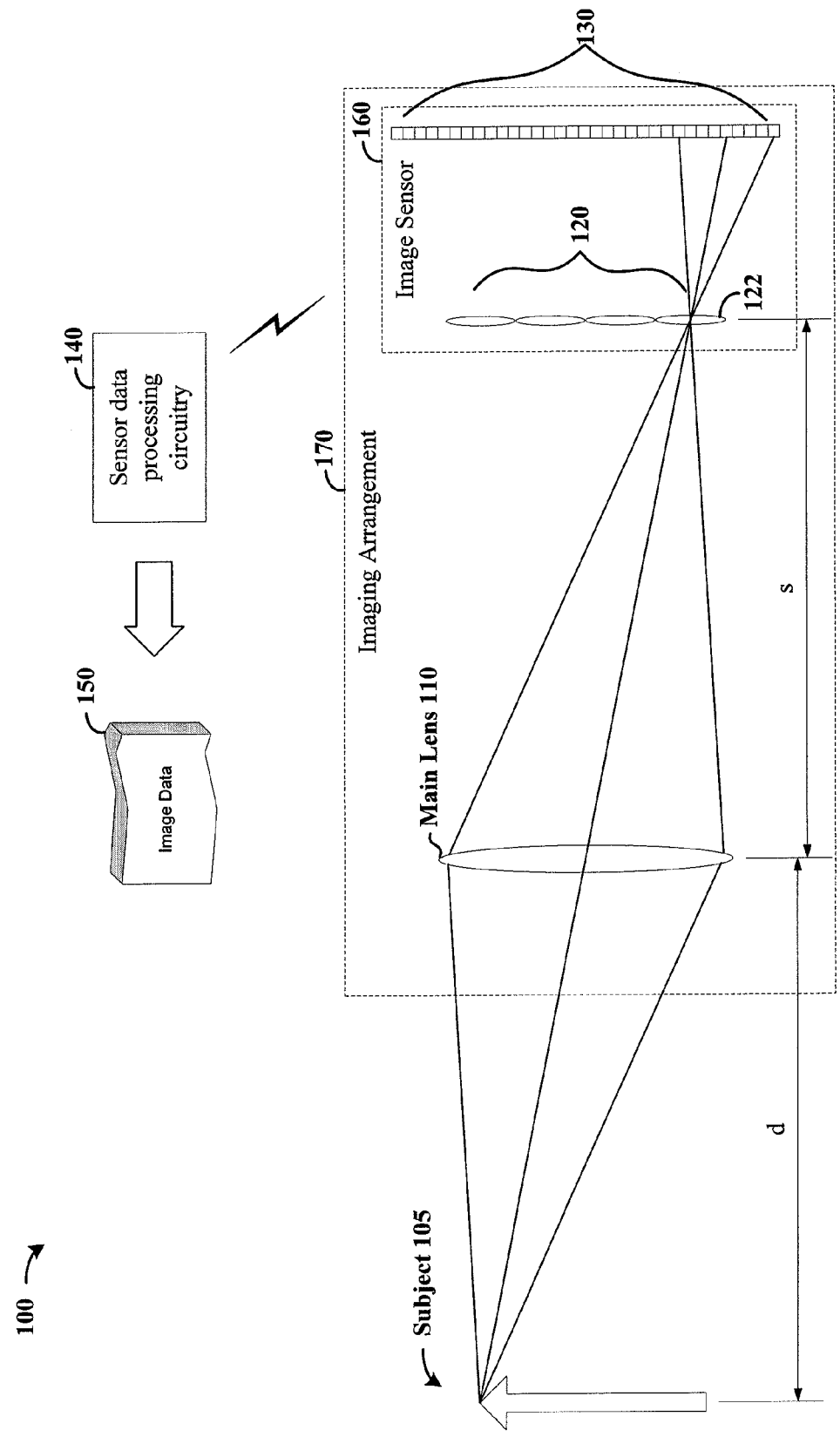
FIG. 1A is an arrangement for detecting light for computing images with a confidence weighting approach, according to an example embodiment of the present invention.

The present invention is believed to be useful for a variety of imaging applications, and the invention has been found to be particularly suited for electronic imaging devices and applications involving light-field sampling and the correction of related images. In these contexts, a "light field" refers to the 4D function that defines the amount of light (e.g., radiance) traveling along each ray in some region of space. In the embodiments discussed below the region of space is typically the interior of the recording optical device, such as the space within the body of a camera, microscope, telescope, etc. In connection with various embodiments described below, primary interest is directed to the rays of light flowing into an imaging plane, such as the focal plane typically defined by the photosensor array in a conventional digital camera. With respect to this imaging plane, "spatial resolution" refers to the sampling density within the 2D imaging plane itself and "directional resolution" refers to the sampling density in the 2D angular domain of rays incident on the imaging plane. While the present invention is not necessarily limited to such applications, aspects of the invention may be appreciated through a discussion of various examples using these contexts.

According to an example embodiment of the present invention, a light field is detected (e.g., sensed or collected) using an approach involving the determination of the amount of light arriving at photosensors located at a detection plane. The two-dimensional distribution of light in the detection plane is recorded, together with information characterizing the set of light rays flowing into each of the photosensors in the detection plane. These data are processed to compute an output image in which at least a portion of the image exhibits correction for an optical aberration of the recording device. Each pixel in the output image is produced via a weighted sum of a subset of the photosensor pixel values. The subset to use, and the weighting to apply to each value in the subset, are determined by an analysis of the geometrical and optical characteristics of the recording device. In this context, assigning a weighting may involve determining a percentage by which to down-weight light data from a photosensor (e.g., where down-weighting to zero removes any contribution of the affected photosensor to the subsequently-created output image pixel).

In another example embodiment, an approach similar to the above is implemented using an imaging system having optics and sensors that sample the space of light rays that are incident upon an imaging plane. A processing system executes computational functionality that renders images from the set of measured rays in different ways to correct for lens aberration. In some applications, the geometry (e.g. position and direction) of the set of rays that are detected by individual photosensors is determined and used to selectively weight the contribution of the individual photosensor values to produce an output image in which a desired trade-off is achieved between correction of optical aberrations and signal-to-noise ratio (SNR).

Each of the optics, sensors and computational functionality (e.g., software-implemented processing) is implemented using a variety of approaches, in combination or distinctly, depending upon the implementation. For example, a camera having lenses (optics) that direct light rays upon a photosensor array (sensors) located at an imaging plane can be used to sample the space of light rays. An output from the photosensor array is used with computational functions and weighting values (e.g., at a processor internal and/or external to the camera) to render images, such as by computing photographs that are focused at different depths or with different depths of field, with computational correction of lens aberrations to produce high quality images.

In another example embodiment, optics and sensor components of an imaging system direct rays of light onto sensor elements such that each sensor element senses a set of rays including rays emanating from specific directions. In many applications, this set of rays is a bundle of rays that is localized in both space and direction. For many applications, this bundle of rays will converge to a single geometric ray of light as the optics and sensor resolutions increase. In this regard, various portions of the description herein refer to the values sensed by the sensor elements as "rays of light" or "light rays" or simply "rays," even though in general they may not be limited to geometric rays.

In the above contexts and for various embodiments, the assembly or assemblies implemented for sensing and/or measuring of a light field are referred to as a "light ray sensor," or a "ray sensor." Further, in discussing ray-space notation, two sets of ray-spaces are considered within the recording device (referred to, for convenience as a "camera"): first, the "ideal ray-space" as pertaining to expected ideal (i.e., non-aberrated) optics; and second, the "aberrated ray-space", which involves rays physically flowing inside the recording device or imaging arrangement. In this context, ideal rays are what would be desirably detected/recorded, and aberrated rays are what are actually detected/recorded (or otherwise present). When implemented with a camera, an aberrated camera ray maps to a world ray via geometric refraction through the optical elements of the camera's main lens. In contrast, an ideal camera ray maps to a world ray via tracing through an idealized approximation (e.g. Gaussian paraxial approximation) of the optical properties of the main lens, free of aberrations.

In various embodiments below, ray-space is denoted by four coordinates, $(x,y,u,v)$, representing the ray that intersects one reference plane at position $(x,y)$ and another at position $(u,v)$. For visualization purposes and to facilitate discussion of the main ideas, the ray space will be denoted more simply, where appropriate, by a two-dimensional (2D) analogue, where $(x,u)$ represents the ray passing through a cross-sectional view of the first reference plane at position $x$, and through a cross-sectional view of the second reference plane at position $u$. To differentiate between the ideal and aberrated ray-spaces, an ideal ray is denoted in various embodiments below as $(x, y, u, v)$ and an aberrated ray as $(x', y', u', v')$. For the 2D case, the ideal ray will be denoted by $(x,u)$ and the aberrated ray by $(x',u')$.

Turning now to the Figures, FIG. 1A shows an imaging system 100 that facilitates the collection of light and computation of an image that is corrected for aberration via selective down-weighting of light data, according to another example embodiment of the present invention. The imaging system 100 includes an imaging arrangement 170 having a main lens 110, a microlens array 120 and a photosensor array 130. In this case, the microlens array 120 and photosensor array 130 implement a light ray sensor. Although FIG. 1A illustrates a particular main lens 110 (single element) and particular microlens array 120, those skilled in the art will recognize that a variety of lenses and/or microlens arrays (currently available or developed in the future) are selectively implemented with a similar approach. For example, the main lens 110 (illustrated as a single-element lens) and/or microlens array 120 (illustrated with a few example microlenses) are replaced with other lenses and lens arrangements, for different applications. As one particular example, the main lens arrangement 210 in FIG. 2A may be implemented as main lens 110, in connection with various embodiments.

For illustrative purposes, rays of light from a point on a subject 105 in an imaged scene are brought to a convergence point on the focal plane of the microlens array 120, which is located at the optical conjugate distance of the subject. A microlens 122 at this convergence point separates these rays of light based on the direction of the light, creating a focused image of the aperture of the main lens 110 on the photosensors underneath the microlens (where oriented laterally as shown, "underneath" refers to a position that is optically beyond the microlens, relative to the main lens).

The photosensor array 130 detects light incident upon it and generates an output that is processed using one or more of a variety of components, with light data at certain photosensors down-weighted relative to its contribution to aberration. The output light data is passed to sensor data processing circuitry 140, which uses the data together with positional information about each photosensor providing the data, as well as weighting data relative to image correction, to generate image data 150 of a scene (e.g., including subject 105).

The sensor data processing circuitry 140 is implemented, for example, with a computer or other processing circuit selectively implemented in a common component (e.g., a chip) or in different components. Using the detected light (and, e.g., characteristics of the detected light) together with a known direction from which the light arrived at the microlens array (as computed using a known location of each photosensor), the sensor data processing circuitry 140 corrects and, where appropriate, refocuses light data in forming an image (where refocusing may include correcting). Various approaches to processing detected light data are described in detail herein, including those approaches described above, with and without reference to other figures. These approaches may be selectively implemented with an approach similar to that described with the sensor data processing circuitry 140.

In various embodiments, different portions of the imaging system 100 are selectively implemented in a common or separate physical arrangement, depending upon the particular application. For example, when implemented with certain applications, the microlens array 120 and the photosensor array 130 are combined into a common image sensor arrangement 160. In some applications, the microlens array 120 and the photosensor array 130 are coupled together on a common chip or other circuit arrangement. When implemented with a hand-held device such as a camera-like device, the main lens 110, microlens array 120 and photosensor array 130 are selectively combined into a common imaging arrangement 170 integrated with the hand-held device. Furthermore, certain applications involve the implementation of some or all of the sensor data processing circuitry 140 in a common circuit arrangement with the photosensor array 130 (e.g., on a common chip).

The microlens array 120 and photosensor array 130 are representatively shown from a two-dimensional perspective with relatively few microlenses and photosensors, but are readily implemented with varied arrangements of microlenses and photosensors. For instance, the microlens array 120 is generally implemented with a multitude (e.g., hundreds, thousands or millions) of microlenses. The photosensor array 130 generally includes a relatively finer pitch than the microlens array 120, with a plurality of photosensors for each microlens in the microlens array 120. In addition, the f-numbers of the microlenses in the microlens array 120 and the f-number of the main lens 110 are generally set such that light passing via each microlens to the photosensor array does not significantly overlap light passed via adjacent microlenses. In some embodiments, this condition is achieved by setting the f-number of the lens to be equal or higher than the f-number of the microlenses.

In various applications, the main lens 110 is translated along its optical axis (as shown in FIG. 1A, in a horizontal direction) to focus on a subject of interest at a desired depth "d" as exemplified between the main lens and an example imaging subject 105. By way of example, light rays from a point on the subject 105 are shown for purposes of this discussion. These light rays are brought to a convergence point at microlens 122 on the focal plane of the microlens array 120. The microlens 122 separates these rays of light based on direction, creating a focused image of the aperture of the main lens 110 on a set of pixels 132 in the array of pixels underneath the microlens.

Figure 1B:
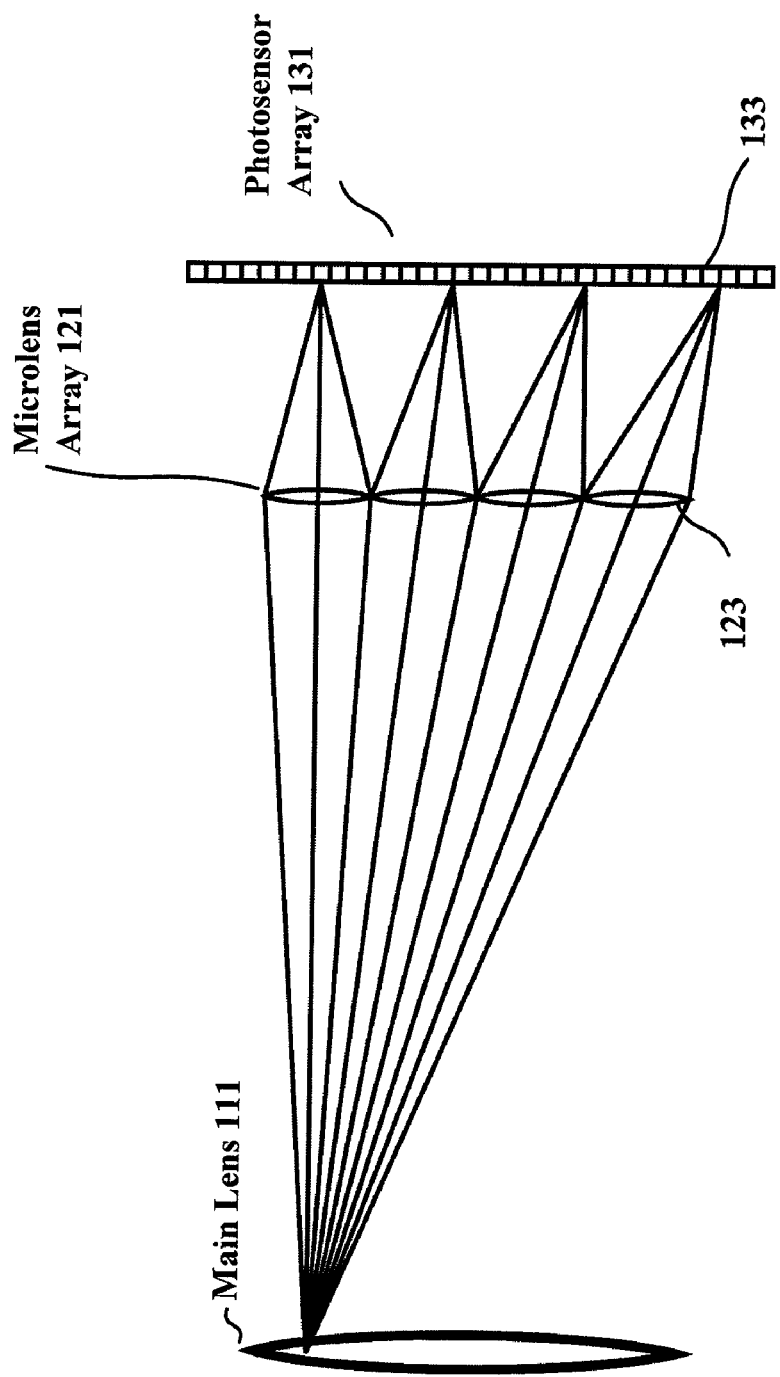
FIG. 1B illustrates a different set of rays within the imaging arrangement of FIG. 1A, according to another example embodiment of the present invention.

FIG. 1B illustrates an example approach to separating light rays, such that all rays emanating from a point on a main lens 111 and arriving anywhere on the surface of the same microlens (e.g., 123) are directed by that microlens to converge at the same point on a photosensor (e.g., 133). This approach shown in FIG. 1B may, for example, be implemented in connection with FIG. 1A (i.e., with the main lens 111 implemented for main lens 110, with microlens array 121 implemented for microlens array 120, and with photosensor array 131 implemented for photosensor array 130).

The image that forms under a particular microlens in the microlens array 122 dictates the directional resolution of the system for that location on the imaging plane. In some applications, directional resolution is enhanced by facilitating sharp microlens images, with the microlenses focused on the principal plane of the main lens. In certain applications the microlenses are at least two orders of magnitude smaller than the separation between the microlens array and the main lens 110. In these applications, the main lens 110 is effectively at the microlenses' optical infinity; to focus the microlenses, the photosensor array 130 is located in a plane at the microlenses' focal depth.

The microlens array 120 is implemented using one or more of a variety of microlenses and arrangements thereof. In one example embodiment, a plane of microlenses with potentially spatially varying properties is implemented as the microlens array 120. For example, the microlens array may include lenses that are homogeneous and/or inhomogeneous, square in extent or non-square in extent, regularly distributed or non-regularly distributed, and in a pattern than is repeating or non-repeating, with portions that are optionally masked. The microlenses themselves may be convex, non-convex, or have an arbitrary profile to effect a desired physical direction of light, and may vary in profile from microlens to microlens on the plane. Various distributions and lens profiles are selectively combined. These various embodiments provide sampling patterns that are higher spatially (correspondingly lower angularly) in some regions of the array, and higher angularly (correspondingly lower spatially) in other regions. One use of such data facilitates interpolation to match desired spatial and angular resolution in the 4D space.

FIGS. 2A-2D show an arrangement (in FIG. 2A) and Cartesian ray-diagram approach (in FIGS. 2B-2C) for sampling a light field, and for resampling to compute images in which aberrations are corrected using a confidence weighting approach, according to another example embodiment of the present invention. For discussion purposes, the figures illustrate the situation with respect to a 2D cross-section of the 3D space in which the rays flow; the skilled artisan would recognize this illustration does not limit the invention to the 2D case. On the contrary, the embodiment applies to the full 4D light field of rays flowing in three-dimensional space.

Figure 2A:
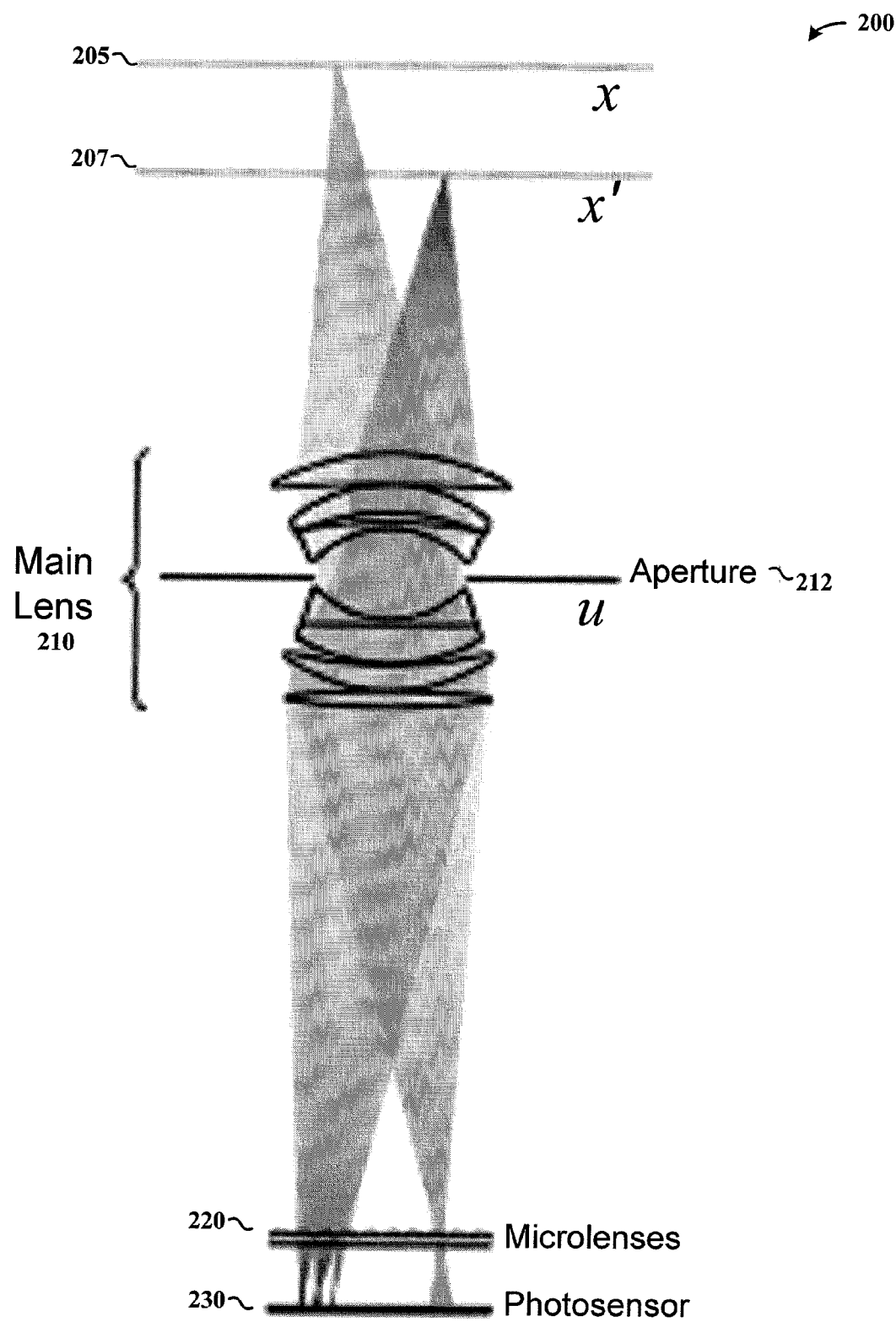
FIGS. 2A-2D show and arrangement and approaches to sampling detected light for computing images with the arrangement, according to another example embodiment of the present invention.

Beginning with FIG. 2A, a camera or camera-type arrangement 200 (e.g., as implemented with various applications such as a microscope) includes a main photographic lens 210 that passes light rays from an image to a microlens array 220, which direct the rays to photosensors in a photosensor array 230. Light flows between point x in a world focal plane 205 and point u at an aperture plane 212. As discussed above, the main lens 210 show in FIG. 2A may be implemented, for example, with the arrangement 100 in FIG. 1A with the main lens 210 in place of main lens 110, and further with the microlenses 220 and photosensor 230 respectively implemented at microlens array 120 and photosensor array 130. As with FIG. 1A, the microlenses and/or photosensors are shown for visualization, and may respectively include a multitude of lenses and photosensors.

Figures 2B, 2C, 2D:
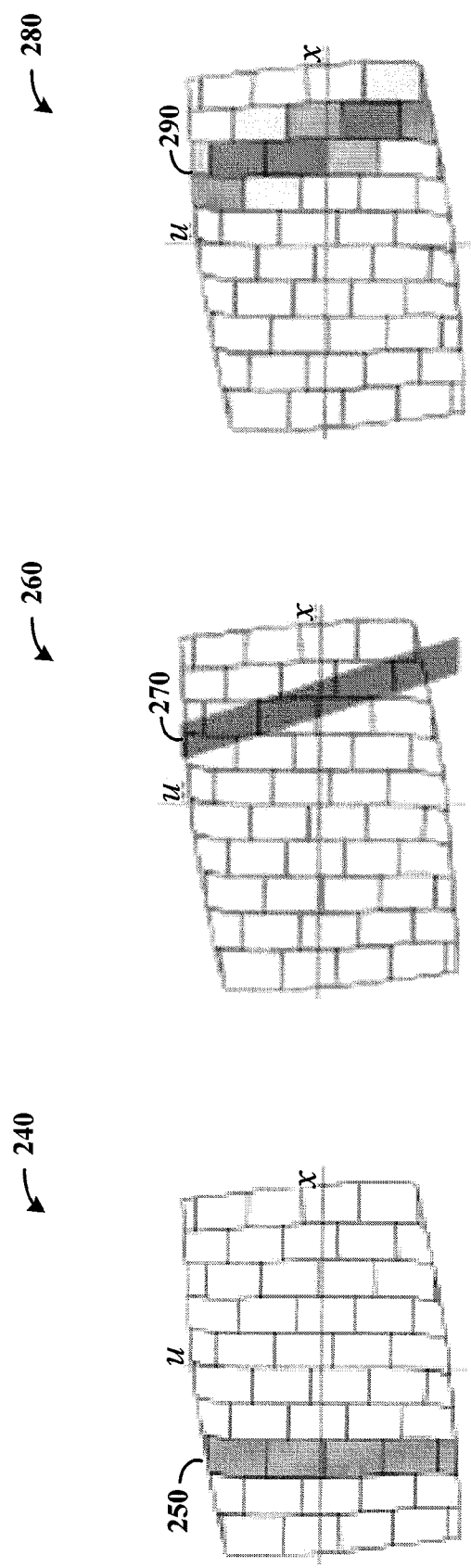

FIG. 2B shows a Cartesian ray-space diagram 240 for rays flowing between points x on the world focal plane and u on the aperture plane 212 of the camera. Each point (x,u) on the grid corresponds to a ray on FIG. 2A passing between position x on the world focal plane 205 and position u on the aperture plane 212. On these diagrams, the value of the function, L, defined at each point in the Cartesian domain corresponds to the amount of light traveling along the corresponding ray in the ray diagram of FIG. 2A. For example, $L(x,u)$ denotes the amount of light traveling along ray (x,u).

A sampling grid is superimposed over FIG. 2B, composed of a number of curved boxes. Each curved box represents the set of light rays contributing to a corresponding photosensor on the photosensor array 230. In some embodiments, each cell in this grid is determined by tracing rays that originate over the corresponding photosensor in FIG. 2A out through the microlenses and into the real world. Their intersection points with the u plane 212 and x plane 205 determine the set of points on the Cartesian ray-space diagram corresponding to that photosensor. For example, the shaded boxes 250 correspond to the set of rays collected by all the photosensor pixels under one microlens.

FIG. 2C shows a Cartesian ray-space diagram 260, with a slanted shaded strip 270 corresponding to the set of light rays emanating from a single pixel region on the x' plane 207 in FIG. 2A. These are the rays that would ideally be integrated to compute the corresponding image value for the pixel region in a photograph refocused on the x' plane 207.

FIG. 2D shows a Cartesian ray-space diagram 280, with grid boxes weighted and summed to estimate the slanted shaded strip 290 in the middle right of the diagram. In an example embodiment of the present invention, these boxes are found, as shown in FIG. 2A, by tracing the desired rays from the x' plane down to intersected pixels on the photosensor 230. This ray-tracing process is the basis for re-sampling methods for correcting for aberrations in the main lens 210. The weighting and summing of grid boxes on FIG. 2D corresponds to weighting and summing the corresponding values of photosensor pixels in the photosensor array.

FIGS. 3A-3D show an approach to the digital correction of lens aberration in computing an output image involving iteration over the pixels of the output image and implemented with the selective downweighting of light samples, according to another example embodiment of the present invention. To generate each pixel in the virtual output image, the set of rays contributing to that pixel is determined by considering, for example, the geometry and optics of a virtual camera. Samples are drawn from this set of rays, and the light value traveling along these sampled rays is determined as described below. The determined light ray values are weighted and combined in order to produce the output image pixel value. The light value traveling along these sampled rays is determined utilizing the optical recipe of the main lens, microlenses and other optics present in the imaging arrangement to trace where the ray terminates in the detecting photosensor array. Values of the photosensors near this termination point are filtered and combined in order to estimate the light traveling along the desired ray.

In an exemplary embodiment of the present invention, a paraxial idealization of the lens used is ray-traced to determine where the rays are desirably converged, and an optical model of the real lens is ray-traced to determine where the rays actually go in the recorded light field. For the latter case, the geometry of all the lens' curved glass elements are modeled (i.e., as in optical engineering) and used to create a virtual optical model of the real lens for ray-tracing.

Figure 3A:
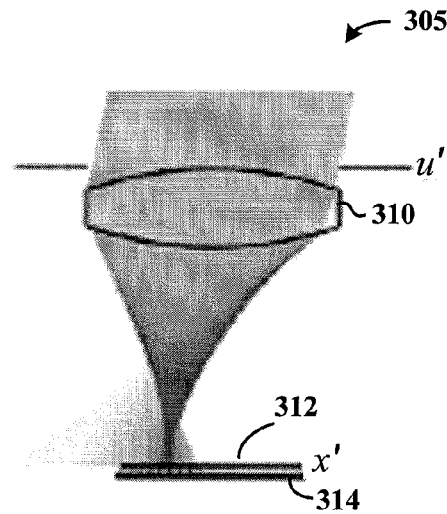

Beginning with FIG. 3A, an exemplary imaging arrangement 305 implemented with a camera includes a main lens 310, microlens array 312 and photosensor array 314. A double-convex lens is shown for the main lens 310 in order to illustrate a relatively high degree of aberration that is visible at the scale of the illustration. Nevertheless, those skilled in the art will recognize that any optical system, including refractive and/or reflective components, and composed of a single or multiple optical elements, may be used in place of the exemplary main lens 310. The requirement is that the optical configuration of the main lens 310 be known sufficiently to determine the transformation of rays from the world into the imaging arrangement 305.

On FIG. 3A, shaded light rays are shown, representing all of the rays from a point in the world, collected by the imaging arrangement 305. In connection with the above ray-tracing approach, contributing rays are traced through the main lens 310, down through the microlens array 312 to the plane in which the photosensor array 314 lies. This ray-tracing approach mimics the process taken by each actual desired ray, and facilitates the location of the sensor pixel that contains that ray's contribution.

Figure 3B:
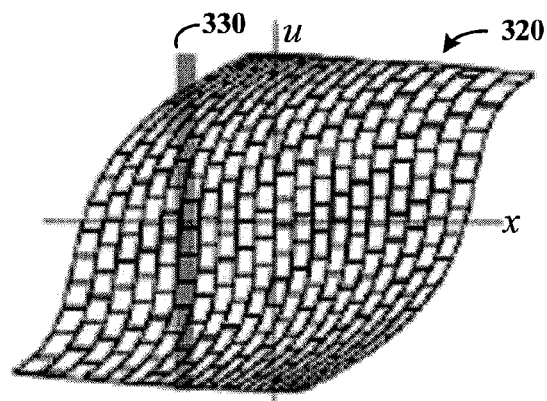

FIG. 3B is a Cartesian ray-space diagram 320 that illustrates an ideal (x, u) ray-space inside the imaging arrangement 305, with the aberrated (x', u') light field sampling grid superimposed. The sampling pattern for an aberrated lens may be significantly distorted from a rectilinear grid, with each photosensor's footprint on the Cartesian diagram no longer a rectilinear box, but a curved one. Each cell in the grid represents the set of ideal rays integrated by a single photosensor pixel in the real (physical) photosensor array 314 inside the imaging arrangement 305. The vertical strip 330 represents the set of rays shown on FIG. 3A, passing through the main lens 310 and microlens array 312 to the photosensor array 314.

Figure 3C:
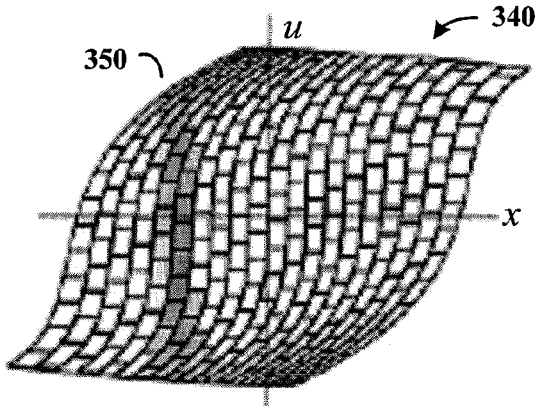

FIG. 3C is a Cartesian ray-space diagram 340 that illustrates an estimation of a desired (i.e., corrected) vertical strip 350 using photosensor values recorded at the photosensor array 314. In some applications, the approach in FIG. 3C is implemented via rasterization of the vertical strip 330 onto the warped grid, and summing the rasterized cells of the grid.

Figure 3D:
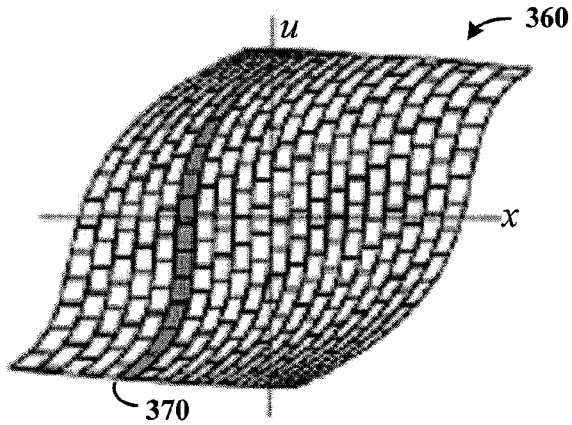

For reference, FIG. 3D is a grid diagram 360 that illustrates all the rays collected by a single microlens in the microlens array 312 of the imaging arrangement 305 without correction. That is, FIG. 3D represents a pixel value that would have been recorded in a conventional photograph without digital correction. The spatial extent of the curved strip 370 is relatively wider, and hence more blurry, than the digitally-corrected estimated strip 350 in FIG. 3C.

In connection with FIGS. 3A-3D and the above discussion, error in the estimation of a desired vertical strip originates from curved boxes with large spatial extent; generally, boxes with a wider total spatial extent tend to pollute the estimate with ray values that are at more distant spatial locations, resulting in a residual aberration blur in the final images. To compensate for (e.g., mitigate or eliminate) such pollution, photosensor pixels with a relatively greater spatial extent are down-weighted using a "confidence weighting" approach, where photosensor values are weighted in proportion to a confidence in the relevance of their values to the current estimate. In order to increase the level of aberration correction it is generally appropriate for the applied weight to decrease as the total spatial extent of the corresponding photosensor increases.

Light data is weighted in a variety of manners, such as by directly applying a weighting factor to light data from a particular photosensor or set of photosensors, or to light data corresponding to a particular image pixel. In one application, a Gaussian fall-off, based on the total spatial extent of the pixel, is used is used to weight each pixel for a particular imaging application. As the magnitude of the projected width of the pixel increases past the width of one microlens, the weighting value of the pixel decreases as a Gaussian with a standard deviation of 1 microlens width. This technique effectively down-weights parts of the aperture that contribute especially aberrated information to a pixel. This approach effectively and selectively reduces the light gathering power at each pixel, facilitating pixel-by-pixel down-weighting akin to stopping down the main lens for that pixel only, while allowing relatively more light to be used in collecting light data to create an entire image.

In connection with another example embodiment and as applicable to FIG. 1A, FIG. 3A-FIG. 3D and other approaches described herein, a pixel-order image synthesis approach is used to compute an image corrected for aberration by extracting the unaberrated energy for an output image pixel from different cells in an aberrated light field. This approach is carried out using, for example, a processor programmed to use light data together with data characterizing the imaging arrangement (e.g., camera) to process the light data and generate an image. For instance, the sensor data processing circuitry 140 as implemented with a camera or with an external processor (e.g., computer) can be programmed to carry out this approach.

The value of each output image pixel is computed via the following steps. First, the ideal camera rays converging to an output pixel are sampled, such as by using a Monte-Carlo method in drawing random samples distributed over the corresponding sensor pixel's area and over the aperture of the lens (see, e.g., Metropolis, N. and Ulam, S. "The Monte Carlo Method" *J. Amer. Stat. Assoc.* 44, 335-341, 1949). After sampling, the world-space conjugates of the rays are computed using an ideal paraxial approximation (see, e.g., Hecht, E. *Optics, 3rd ed.* Reading, Mass.: Addison-Wesley, 1998) for the camera lens used in collecting light for the image. Next, the direction of each world ray is reversed and ray-traced back into the camera through a geometrically accurate model of the camera's lens, through the microlens array and down to the sensor surface. The radiance is estimated along each ray from the neighborhood of sensor pixel values in the recorded light field. In some applications, quadrilinear interpolation of a nearest number of samples (e.g., 16) in 4-D space is used in computing an image. In certain applications, relatively lower-quality nearest-neighbor interpolation is used for speed (e.g., using the value of the nearest pixel alone). In other applications, relatively slower, wider reconstruction filters are used to compute an image with relatively higher image quality. The radiance estimates are then averaged and used to compute a final output pixel value.

For some applications, another exemplary embodiment of the present invention utilizes a ray-order image synthesis approach to compute output images. This approach can be viewed as being similar to that described above with the pixel-order approach, with the order of operation reversed as relative to tracing through real optics with aberrations and tracing through idealized paraxial optics without aberrations.

As with the pixel-order approach above, a processor or other computing arrangement is implemented to carry out the processing as may, for example, be implemented with the sensor data processing circuitry 140 shown in FIG. 1A. In these contexts, various implementations of the ray-order method may be relevant to a re-projection of the aberrated energy in the light field into an unaberrated output photograph.

First, the ray-order synthesis samples the set of rays inside the camera that would converge to a corresponding photosensor pixel. One approach to sampling this bundle of rays involves a Monte-Carlo method in which random samples are drawn over the area of the photosensor pixel, and random directions over the photosensor pixel's parent microlens. These rays are traced away from the sensor surface, through the microlenses, through the geometrically accurate model of the camera's lens and out into the world. The direction of the world rays (e.g., rays from a scene entering a camera) is reversed and their optical conjugates are computed back into the camera using the ideal paraxial approximation of the camera's lens. These rays are intersected with the desired virtual imaging plane, and at each location, the light field sample value corresponding to these rays is added into a running sum of the values at the output image pixel in the corresponding location. After this process concludes, the value of each output image pixel is normalized by dividing by the number of rays summed at the pixel over the course of processing the entire light field.

Light data detected in the above approaches is weighted according to the nature of the light relative to the optics and photosensors. A variety of approaches are implemented to weight the value of light detected at photosensors when computing portions of an image corresponding to the detected light. Several of these approaches are discussed herein as confidence weighting, or weighting light values based upon a confidence level pertaining to a known or otherwise detected or determined position of light rays upon a particular sensor. For instance, some applications are directed to down-weighting (e.g., reducing the value of) light data detected at certain photosensors in response to determining that light incident upon the photosensors is subject to aberration via the optical arrangement used to direct the light. These weighting approaches are used to correct for aberration, such as by reducing or eliminating the contribution of certain light data in regions of computed images in order to enhance contrast in the computed images. The following description more particularly characterizes aspects of various approaches to addressing aberrations as carried out in connection with several example embodiments.

In some applications, non-linear distortions introduced by aberrations cause some light field cells to pollute a generated image more than other light field cells. This pollution can occur in different manners and is addressed accordingly. For instance, in some applications, the same region of a particular scene can appear with very different amounts of blur when viewed from different parts of a lens. In other applications, in looking at the projection of ideal vertical strips of ray space onto an aberrated light field sampling grid, some grid cells are wider than the ideal strip, leading to larger amounts of blur, with "ideal" in this context referring to non-aberrated conditions. For example, in FIG. 3D (discussed above), the widest grid cells contributing to the estimate are at the top of the grid. Where a photograph is generated using a re-sampling of light rays detected using a 4-D approach as described above, such non-linear distortions can adversely affect the ability to generate a quality image.

The above and other conditions involving aberration can be addressed by down-weighting certain light rays subject to aberration, and re-computing an image in accordance with the down-weighting. The contribution of each photosensor pixel is weighted less as its spatial extent increases when projected onto the output image plane (see, e.g., FIG. 3C by way of example). Note that the spatial extent may vary when the output image plane changes due to a desired virtual refocusing of the output image. For instance, in connection with the above pixel-order approach, a weighted average of light field sample values is computed in the final step as described above.

In various embodiments, the following weight function is used in weighting light data, where $\Delta x$ and $\Delta y$ are the projected width and height of the light field cell in the output image. For convenience, the units are in terms of output pixel widths.

$$w(\Delta x, \Delta y) = h(\Delta x) \cdot h(\Delta y), \quad \text{Equation 1}$$

where $$h(x) = \begin{cases} 1, & x \leq 1 \\ \exp\left(-\frac{(1-x)^2}{2\sigma^2}\right), & x > 1. \end{cases}$$

In words, the weighting function decreases according to a Gaussian fall-off as the projected width of the cell increases beyond one output image pixel. The x and y dimensions are treated separately, with the overall weight being the product of the weights for each dimension. A standard deviation of $\sigma=2$ is used in one application for the Gaussian fall-off. Generally, the weight tends to be higher for rays passing through the lens near its center, where aberrations tend to be lower. The weight further varies across the pixels in the same sub-aperture image, with the weight being higher for areas in sharp focus. Calculation of $\Delta x$ and $\Delta y$, which varies as a function of (x, y, u, v), is discussed below. In this regard, the weight of blurry samples is reduced and, where the image is digitally corrected, this weighting reduction works to reduce residual blur in the corrected image.

While Equation 1 above defines one weighting function, a variety of other weighting functions are implemented for various example embodiments. Generally, choosing a weighting function that reduces the weight of cells with larger projected area more aggressively results in greater contrast and resolution, with a trade-off in that reducing the average weight (normalized to a maximum weight of 1) decreases the effective light gathering power of each output pixel. Using this weighted correction approach and as relative to a conventional correction approach involving the stepping-down of an aperture, extra freedom of varying the aperture across the image plane is realized. That is, the effective aperture may be stepped down on a pixel-by-pixel basis, down-weighting each pixel as appropriate without necessarily adversely affecting the amount of light collected and used to generate an image for other pixels and, correspondingly, facilitating the production of a sharper image.

FIG. 4A-D shows exemplary Cartesian ray-space diagrams and ray-trace diagrams that facilitate a mathematical discussion of the approach used to compute $\Delta x$ and $\Delta y$ for the weighting function in Equation 1 according to various embodiments of the present invention. These figures illustrate an approach to determining correspondences between rays in the ideal and aberrated ray-spaces inside the camera for the purpose of correcting the effect of optical aberrations in portions of output images. These two ray-spaces are connected by the common space of rays in the world. An aberrated camera ray maps to a world ray via geometric refraction through the glass elements of the main lens. In contrast, an ideal camera ray maps to a world ray via tracing through an idealized approximation of the lens' optical properties that is free of aberrations, such as a Gaussian idealization of the lens based on paraxial optics (also well-known as the thick lens approximation).

These two mappings into the world space define a mapping, C, directly from the aberrated space to the ideal space: C: $R^4 \to R^4$, such that C(x', y', u', v')=(x, y, u, v). In discussion of various embodiments below, C is referred to as the "ray correction function" or simply "correction function." C results from composing the mapping from aberrated rays to world rays with the inverse of the mapping from ideal rays to world rays.

Figure 4A:
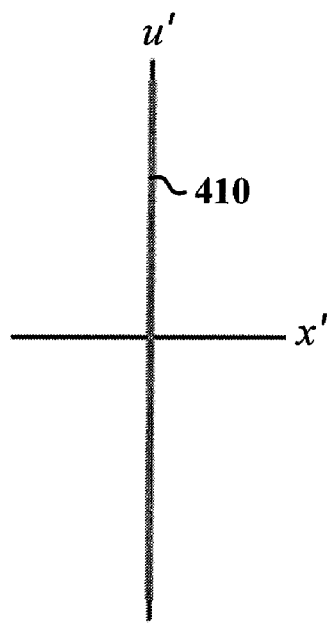
Figure 4B:
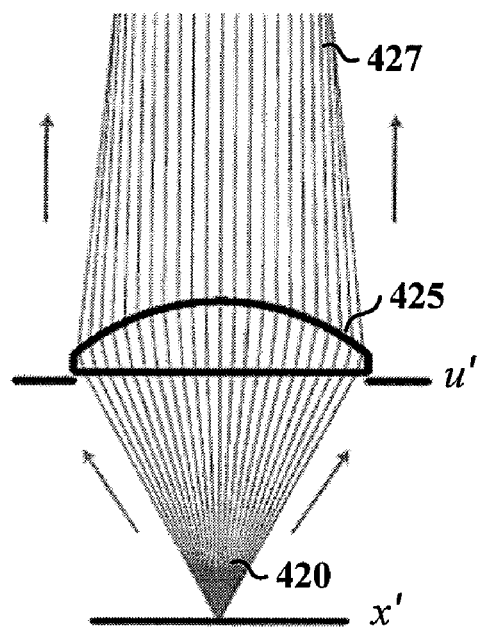
Figure 4C:
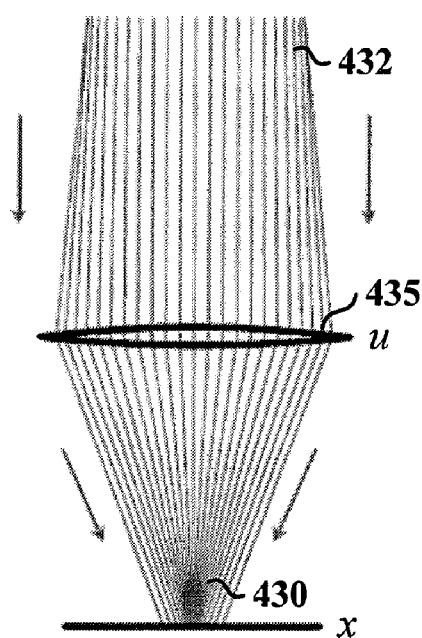
Figure 4D:
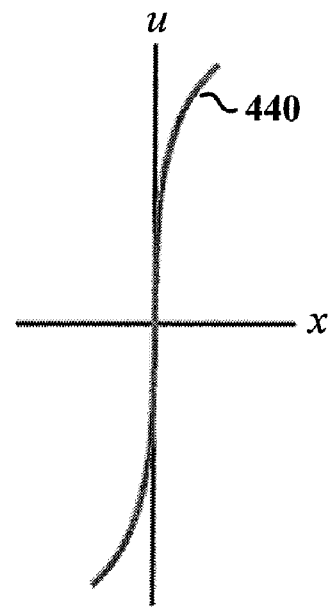

FIG. 4A shows a Cartesian ray-space diagram for the aberrated ray space, along with an exemplary set of rays lying on a line 410 at the vertical u' axis. This set of rays corresponds to the set of rays 420 shown on the ray diagram of FIG. 4B. FIG. 4B illustrates optically tracing this set of aberrated camera rays out into the world through a virtual optical model of the camera's optics 425, resulting in a set of world rays 427. These world rays are replicated on FIG. 4C as world rays 432, which are traced back into the camera through idealized camera optics, exemplified in the figure as an ideal thin lens 435. The resulting set of ideal camera rays 430 corresponds to the set of rays lying along a curve 440 in the Cartesian ray-space diagram for the ideal ray space in FIG. 4D.

With this approach FIGS. 4A-4D show how to compute the function C in connection with various example embodiments of the present invention.

Returning to the discussion of computing $\Delta x$ and $\Delta y$ for the weighting function in Equation 1, in some applications this computation involves projecting the aberrated light field cell onto the output image plane and calculating its 2-D (two-dimensional) size. In some applications, it is sufficient to approximate the projected size by assuming that the correction function, C, is locally linear over the light field cell. In this case, $\Delta x$ can be approximated using the first-order partial derivatives of the correction function:

$$\Delta x \approx \frac{1}{\Delta x'}\left(\left|\frac{\delta C_x}{\delta x'}\Delta x'\right| + \left|\frac{\delta C_x}{\delta y'}\Delta y'\right| + \left|\frac{\delta C_x}{\delta u'}\Delta u'\right| + \left|\frac{\delta C_x}{\delta v'}\Delta v'\right|\right), \quad \text{Equation 2}$$

where the four components of C are explicitly defined as:

$C(x',y',u',v') = (C_x(x',y',u',v'),$ $C_y(x',y',u',v'),$ $C_u(x',y',u',v'),$ $C_v(x',y',u',v')) = (x,y,u,v).$

The analogous equation for $\Delta y$ is $$\Delta y \approx \frac{1}{\Delta y'}\left(\left|\frac{\delta C_y}{\delta x'}\Delta x'\right| + \left|\frac{\delta C_y}{\delta y'}\Delta y'\right| + \left|\frac{\delta C_y}{\delta u'}\Delta u'\right| + \left|\frac{\delta C_y}{\delta v'}\Delta v'\right|\right). \quad \text{Equation 3}$$

In the above equations, dividing by $\Delta x'$ and $\Delta y'$ normalizes the units so that they are relative to the size of output image pixels, as required by the weighting function in Equation 1. In addition, the partial derivatives in these equations vary as a function of the light field cell position (x, y, u, v). For example in FIGS. 3A-3D, $\delta C/\delta x'$ and $\delta C/\delta u'$ are the vectors parallel to the distorted horizontal and vertical lines of the sampling grid, and the distortion varies over the ray-space. The value of the partial derivatives is computed using simple finite differences of the sampled correction function, C. In this regard, computing C(x', y', u', v') is a matter of tracing ray (x', y', u', v') out of the camera into the world using a model of the real optics, then ideally conjugating it back into the camera using idealized paraxial optics. In addition, $\Delta x'$, $\Delta y'$, $\Delta u'$ and $\Delta v'$ are constants in Equations 2 and 3. $\Delta x'$ and $\Delta y'$ are the width and height of the microlenses in the light field camera. The values $\Delta u'$ and $\Delta v'$ represent the projected size of the sensor pixels on the (u', v') lens plane. For example, a planoconvex lens may be implemented with these approaches, with a clear aperture diameter of approximately 40 mm. Assuming an exemplary directional resolution of 12×12, $\Delta u'$ and $\Delta v'$ are approximately 3.33 mm for the planoconvex lens in question.

In another example embodiment of the present invention, final images of a scene are generated with improved image quality by recording the light field contributing to an ordinary photograph and computationally resampling the recorded light field values using a ray-tracing approach. In this embodiment, the light field is recorded using an imaging arrangement as shown in FIG. 2A, consisting of a conventional camera (main lens 210 and photosensor 230), with a microlens array 220 inserted in front of the photosensor. The microlenses in the microlens array 220 are larger than the photosensor pixels in the photosensor array 230. The microlenses are refractive convex microlenses. The f-number of the microlens apertures typically match or are lower than the f-number of the main lens, such that no photosensor pixel collects light rays passing through more than one microlens. The photosensor array is positioned parallel to the microlens array, typically at a separation that is approximately equal to the focal length of the microlenses. When the photosensor array is exposed in a photographic exposure, the values appearing in the array of photosensors provides a recorded sampling of the light field flowing into the imaging plane defined by the microlens plane relative to the main lens.

In this embodiment, final images are computed from the recorded sampling of the light field utilizing a ray-tracing approach. For each pixel in an output image, a set of rays in the world (outside the imaging arrangement) is chosen as the set that contributes to the value of the output image pixel. A typical method for choosing this set is to choose a focal plane for the desired output image pixel; the set of rays is equal to the set of rays that passes through the corresponding pixel area on this focal plane and the aperture 212 of the main lens. The light value traveling along each ray in this set is determined by tracing the ray from the world through a virtual optical model of the imaging arrangement, refracting through the optics of the main lens 210 and microlenses 220 to an intersection position on the photosensor array 210. The value along the ray is determined from the values of the photosensor pixels in a neighborhood of this intersection point. A typical method for determining the value is to set it equal to the value of the photosensor pixel that contains, or is closest to, the intersection point. In other exemplary embodiments, the value is set equal to a bilinear interpolation of the closest four photosensor pixels, or a quadrilinear interpolation of the closest four photosensor pixels at corresponding locations under the closest four microlenses. Given the set of values for each of the light rays contributing to the output image pixel, the value for the output image pixel value is determined as a function of the ray values. A typical function is an integration of the ray values over the set of rays.

In an exemplary variation of this embodiment, the separation between the photosensor array 230 and microlens array 220 is varied. Typical separation values vary between zero and one microlens focal length. As the separation decreases from one focal length down to zero, the ability to compute accurate refocused output images decreases. In this case refocusing refers to virtual focusing at a depth different than the conjugate world depth of the microlens array 220 with respect to the main lens 210. However, as the separation decreases in this manner, the maximum resolution of the computed output image increases. For further details in this regard, reference may be made to U.S. Patent Publication 2010/0026852, which shares a common assignee with the present application.

In another exemplary variation of this embodiment, the contribution of different light rays to an output image pixel is weighted differentially in order to raise the quality of the resulting output image. The rays that are recorded in the light field with most aberration relative to the desired output image pixel are weighted less. In a specific exemplary variation, the weighting is given by Equation 1, in connection with Equations 2 and 3. In this variation, the correction function, C, is set such that the ideal camera ray space has the imaging plane x (with respect to FIG. 4C) coincide with the optical conjugate of the desired world focal plane for the output image pixel. According to this approach, the weighting varies depending on the desired focal depth for the output image. Rays passing through different parts of the lens aperture contribute most to output image pixels when the desired focal depth of those pixels matches the depth at which those rays provide the least residual aberration.

For general information regarding imaging approaches and for specific information regarding imaging approaches that may be selectively implemented in connection with one or more various example embodiments described herein, such as for generating an image with a 4-D light field, and for focusing and/or correcting for lens aberration, reference may be made to PCT Patent Application No. PCT/US2005/035189, entitled "Imaging Arrangements and Methods Therefor," naming inventors Yi-Ren Ng, Patrick Hanrahan, Marc Levoy, and Mark Horowitz and filed on Sep. 30, 2005, which is fully incorporated herein by reference.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include implementing the various optical imaging applications and devices in different types of applications, increasing or decreasing the number of rays collected per pixel (or other selected image area), adjusting weighting approaches relative to the spatial extend of image data collected at a particular pixel, correcting for wavelength-dependent refraction of lenses, or implementing different algorithms and/or equations than the examples described to assemble or otherwise process image data. Other changes may involve using coordinate representations other than or in addition to Cartesian coordinates, such as polar coordinates, and/or using various other weighting and other schemes to facilitate the reduction or elimination of aberrations. Such modifications and changes do not depart from the true spirit and scope of the present invention.

What is claimed is:

1. A method for processing light data using light collected with an imaging arrangement including a main lens that focuses light to microlenses at a focal plane, and photosensors that include, for each micro lens, a plurality of photosensors arranged to receive light directed by the microlens, the method comprising:
    using the photosensors to collect light that is directed by the microlenses, and to output light data characterizing the collected light, wherein the collected light data comprises a four-dimensional (4D) light field function;
    weighting the light data as a function of an optical characteristic of the imaging arrangement and a light ray path of the collected light through the main lens and micro lenses, thereby providing weighted light data values;
    digitally processing the light data as a function of the weighted light values and the light ray path; and
    using the digitally processed light data to output image data in which at least a portion of the image data is corrected.

2. The method of claim 1, wherein using the digitally processed light data to output image data in which at least a portion of the image data is corrected includes outputting image data in which at least a portion of the image is corrected for lens aberration.

3. The method of claim 1, wherein digitally processing the light data as a function of the weighted light values and the light ray path includes down-weighting light data having a large spatial extent in a Cartesian diagram that characterizes the light to facilitate the correction of lens aberration.

4. The method of claim 3, wherein down-weighting includes reducing the value of light data to about zero for light data having a spatial extent wider than a determined output pixel.

5. The method of claim 1, wherein digitally processing the light data as a function of the weighted light values and the light ray path includes down-weighting light data corresponding to localized regions of high curvature in the ray space of the collected light.

6. The method of claim 1, wherein digitally processing the light data as a function of the weighted light values and the light ray path includes computing the value of each output image pixel by:
    sampling camera rays converging to an output pixel;
    computing the world-space conjugates of the rays using an ideal paraxial approximation for the main lens used in collecting light for the image;
    reversing the direction of the world rays and ray-tracing the world rays back into the imaging arrangement through a geometrically accurate model of the main lens, through the microlenses and down to the photosensors; and
    estimating the radiance along each ray from the neighborhood of sensor pixel values in the collected light.

7. The method of claim 6, wherein sampling camera rays converging to an output pixel includes using a Monte-Carlo method to draw random samples distributed over the corresponding sensor pixel's area and over the aperture of the lens.

8. The method of claim 6, wherein using the digitally processed light data to output image data includes quadrilinearly interpolating a nearest number of samples in four dimensional space.

9. The method of claim 6, wherein using the digitally processed light data to output image data includes:
    interpolating a nearest number of samples in four-dimensional space using a nearest neighbor interpolation to facilitate relatively fast interpolation;
    averaging the radiance estimates; and
    using the averaged radiance estimates to compute a final output pixel value.

10. The method of claim 6, wherein using the digitally processed light data to output image data includes:

interpolating a nearest number of samples in four-dimensional space using wide reconstruction filters to compute an image;

averaging the radiance estimates; and using the averaged radiance estimates to compute a final output pixel value.

11. A digital imaging system for computing an image from a set of detected light rays, the system comprising:

a main lens;

a photosensor array to detect a set of light rays;

a microlens array between the main lens and the photosensor array, the set of light rays being optically directed from the main lens and through the microlens array to the photosensor array, wherein the photosensor array includes for each micro lens, a plurality of photosensors arranged to receive light directed by the microlens; and an image data processor to, weight four-dimensional (4D) light data detected at the photosensors as a function of optical characteristics of the imaging arrangement, thereby providing weighted light data values;

digitally re-sample the light field as a function of the weighted light values and a light ray path of the directed light; and use the digitally re-sampled light field to output image data in which at least a portion of the image is corrected.

12. The system of claim 11, wherein the image data processor and the main lens, photosensor array and microlens array are implemented in a common imaging arrangement.

13. The system of claim 11, wherein the image data processor is remote from the main lens, photosensor array and microlens array.

14. A method for digital imaging with a camera having a main lens, a microlens array and a photosensor array, the photosensor array arranged to detect light dispersed by the microlens array and including, for each microlens in the microlens array, a plurality of photo sensors arranged to receive light from the micro lens, the method comprising:

using the microlens array to direct light to the photosensor array;

collecting light with the photosensor array and outputting four-dimensional (4D) light data corresponding to the collected light by each photosensor;

weighting the light data as a function of optical characteristics of the imaging arrangement and a light ray path of the collected light, to which the light ray data corresponds, through the main lens and microlenses, thereby providing weighted light data values;

digitally re-sampling the light field as a function of the weighted light data values and a ray-tracing of the light ray path in the camera; and using the digitally re-sampled light field to compute an output image in which at least a portion of the image is corrected.

15. A method for processing light data, the method comprising:

collecting light that is directed by a plurality of microlenses;

generating light field data characterizing the collected light, wherein the light field data comprises a four-dimensional (4D) function that defines an amount of radiance traveling along a light ray in a region of space;

weighting the light field data as a function of an optical characteristic of an imaging arrangement and a light ray path of the collected light through a main lens and micro lenses, thereby providing weighted light data values;

digitally processing the light field data as a function of the weighted light field values and the light ray path;

using the digitally processed light data to output image data representing a captured image in which at least a portion of the image data is corrected; and modifying the output image data to change a focal point of the image to be different from a focal point of the captured image.

* * * * *